Oct. 3, 1944.   E. C. RANEY   2,359,676
CONTROL APPARATUS
Filed Feb. 20, 1942
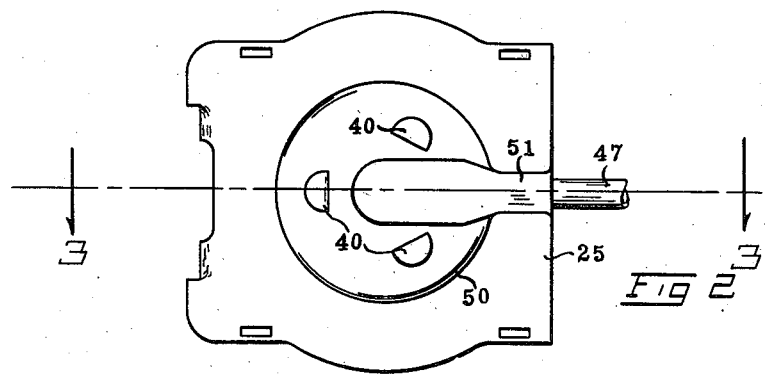
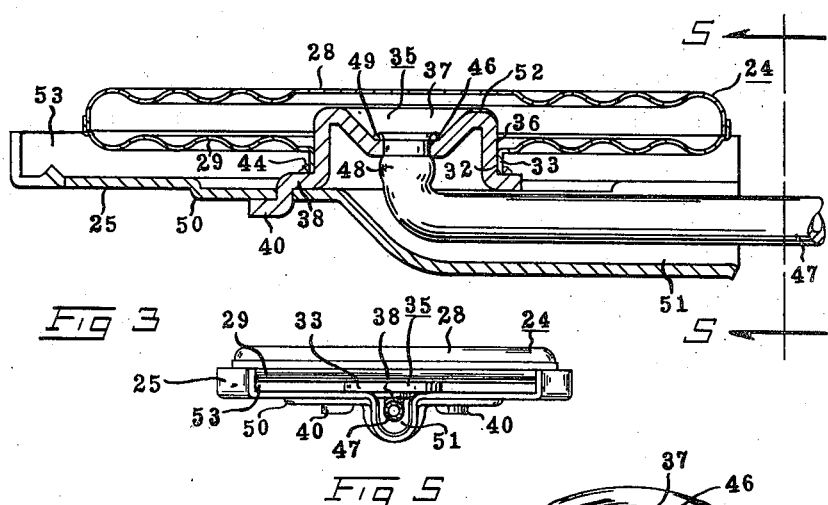
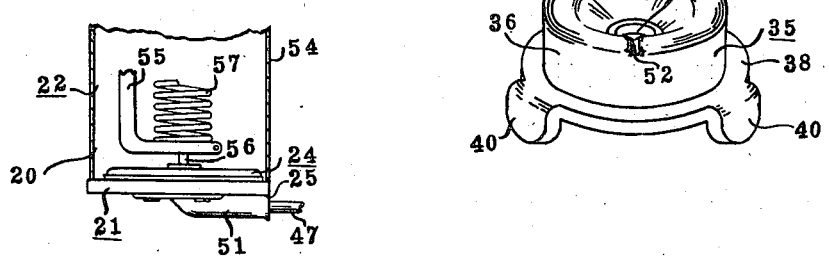
INVENTOR
ESTEL C. RANEY
BY
ATTORNEY Patented Oct. 3, 1944

2,359,676

UNITED STATES PATENT OFFICE 2,359,676

CONTROL APPARATUS

Estel C. Raney, Franklin County, Ohio, assignor to Ranco Incorporated, a corporation of Ohio Application February 20, 1942, Serial No. 431,765

2 Claims. (Cl. 137—156.5)

The present invention relates to an improvement in pressure responsive devices.

Heretofore, pressure responsive devices have been formed by mounting a chamber having one or more flexible walls on a relatively rigid member. The rigid member had an opening therein and the end of a tube was attached to the member at the opening for connecting the interior of the chamber with a source of pressure. The connection between the tube and rigid member was generally effected by solder and often the tube was flexed in the handling of the mechanism with which the pressure responsive device was connected, so that either the tube would be broken or the solder at the connection would be loosened causing a leak at the joint. This invention is directed to an improvement whereby flexing of the tube at the connection is prevented.

An object of the present invention is to mount the rigid member on a wall section forming a part of a casing for housing a control apparatus, which wall section has a yoke like portion through which the tube extends, the width of the yoke and diameter of the tube being such that the walls of the yoke prevent the tube from being rotated radially.

Further objects and advantages will be apparent from the following description, reference being had to the accompanying drawing wherein a preferred form of embodiment of the present invention is clearly shown.

In the drawing:

Fig. 1 is fragmentary view, partly in section, of a control apparatus embodying my invention;

Fig. 2 is a bottom view of a pressure responsive device forming a part of the control apparatus shown in Fig. 1, the device being shown on a larger scale;

Fig. 3 is a view in section taken on line 3—3 of Fig. 2 but on a larger scale;

Fig. 4 is a perspective view of an element of the pressure responsive device; and, Fig. 5 is a view taken on line 5—5 of Fig. 3, but on a reduced scale.

Referring to the drawing, I have shown a preferred form of the invention as embodied in a control apparatus 20. The control apparatus 20 comprises a pressure responsive device 21 and a controller 22 that is actuated by the device 21.

The pressure responsive device 21 comprises an expansible diaphragm 24 that is mounted on a base plate 25. The diaphragm is formed by two confronting, thin flexible discs of metal 28 and 29, the edges of which discs are turned inwardly so that the edges of disc 29 overlap the edges of the disc 28. The joint between the edges of the discs are silver soldered for forming a gas tight and flexible seal. Preferably, the discs 28 and 29 are formed of beryllium copper, and are approximately .005" thick. Also, the discs are formed having concentric corrugations therein for rendering them more flexible. The disc 29 is provided with a central opening 32 and a continuous lip 33 is formed about the opening.

The diaphragm 24 is attached to a hub-like member 35, which member is extended into the opening 32. The member 35 is formed of sheet metal and has a cylindrical portion 36. One end of the member is closed by an end wall and a conical depression 37 is formed in the wall. The opposite end of the member is provided with an outwardly extending peripherial flange 38, and three lugs 40, all similar in size and shape, extend from the periphery of the flange 38. Before the diaphragm is mounted on the plate 25, the lugs 40 extend downwardly relative to the flange 38 as may be seen in Fig. 4. The lip 33 of the plate 29 surrounds the cylindrical portion 36 of the member 35 and is sealingly attached to that portion by solder 44 for forming a gas tight seal.

A circular opening 46 is formed in the end wall of the member 35 having the conical depressions 37, and the end of a tube 47 extends through the opening. The tube 47 is secured in the opening by flaring the end portion thereof outwardly against the material adjacent the edges of the opening and bulging the tube at 48 on the opposite side of the end wall. The joint between the end of the tube 47 and the material at the edge of the opening 46 is sealed by a ring 49 of silver solder. The tube 47 has a right angle bend adjacent the connection between the tube and member 35. The tube 47 can be connected with the source of fluid pressure to which the device 21 is to be responsive.

The end of the member 35 extending into the diaphragm 24 forms a stop for limiting contraction of the diaphragm. Preferably, a channel 52 is formed in the end wall of the cup-like member 35 for forming a passage for fluid from the outlet of the tube 47 to the interior of the diaphragm when the disc 28 of the diaphragm is pressed against the end of the member 35.

The member 35 is mounted on the base plate 25, which plate also forms a wall of the casing for the apparatus, as will be more fully explained hereinafter. The base plate 25 is formed of sheet metal and has two flanges 53 extending along two opposite side edges, and a circular boss 50 is formed in the central portion thereof. A yoke like section or channel 51 is also formed in the base member and this channel extends from the central portion to an outer edge. Preferably, the width and depth of the channel is such that the tube 47 is confined between the walls of the channel and therefore, the tube cannot be rotated about the end thereof connected with the member 35. Thus, breakage or loosening of the joint of the tube with the member 35 by handling the control apparatus is minimized. Also the wall section, or base plate 25, forms a shield for the junction of the tube and member 35. The boss 50 is provided with three slots therethrough for receiving the lugs 40 of the member 35. The flange 38 of the member 35 rests against the inside of the boss 50 and the lugs 40 extend through the slots formed in the boss and these lugs are clinched against the outside surface of the boss for securing the member 35 to the base plate.

The base plate 25 is attached by any suitable method to one end of a housing 54 in which the controller 22 is located.

The controller 22 could be any suitable type of control or indicating apparatus that is to be responsive to changes in pressure. Assuming, for example, it is a switch for controlling the operation of a refrigerator motor, the switch mechanism, which is not shown, is operated by a lever 55 that is actuated by expansion and contraction of the diaphragm 24. The diaphragm is connected to the lever by a shaft 56. A compression spring 57 is shown for counteracting the expansion of the diaphragm. Preferably, the tube 47 is connected with a bulb, not shown, which bulb is placed in heat exchange relation with the evaporator of the refrigerator, and the bulb, tube and diaphragm are filled with a temperature responsive fluid so that the diaphragm will expand and contract according to changes in temperature at the bulb for operating the switch.

By my invention I have provided a pressure responsive device that can be formed of few and inexpensive parts and in which the connection between the expansion portion of the pressure responsive device and the tube for connecting the device with a source of pressure is protected from injury.

While the form of embodiment of the present invention as herein disclosed constitute a preferred form, it is to be understood that other forms might be adopted, all coming within the scope of the claims which follow:

I claim:

1. A pressure responsive device comprising a plate provided with a centrally disposed group of openings and a channel extending from within said group to the edge of said plate; a hub member having a central opening and peripheral lugs; an expansible diaphragm with opposed flexible walls joined at their outer edges, one of said walls being secured at its central portion to said hub; and a tube connected at one end to said hub member and within said central opening and communicating with the interior of said diaphragm, the lugs on said hub being disposed in the openings in said plate and clinched at the underside thereof to retain these members in assembled relationship, said tube being disposed in the channel in said plate to preclude lateral movement of said tube.

2. A pressure responsive device comprising a plate provided with a channel extending from an intermediate portion to the outer edge thereof; a hub member secured to said plate over the inner end of said channel, said hub having a cylindrical side wall portion and a top wall with a depressed central portion formed with an opening; a diaphragm including upper and lower spaced flexible walls, the latter having an opening through which said hub projects to serve as a stop for said upper wall, said diaphragm being secured to said hub; and a capillary tube secured at one end to the underside of the top wall of said hub and communicating with the interior of said diaphragm, said tube being disposed in said channel to prevent lateral movement thereof.

ESTEL C. RANEY.